(12) United States Patent
Harvey et al.

(10) Patent No.: US 8,317,967 B2
(45) Date of Patent: Nov. 27, 2012

(54) STRUCTURAL URETHANE ADHESIVES COMPRISING AMIDE POLYOLS

(75) Inventors: Raymond Scott Harvey, Worthington, OH (US); Amy Gran, Mechanicsburg, OH (US); Yulia Alekseevna Vasilieva, Dublin, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 545 days.

(21) Appl. No.: 12/554,085

(22) Filed: Sep. 4, 2009

(65) Prior Publication Data

US 2011/0059318 A1    Mar. 10, 2011

(51) Int. Cl.
*C09J 175/12* (2006.01)
*C08G 69/26* (2006.01)
*C08G 69/28* (2006.01)

(52) U.S. Cl. .................. 156/331.4; 156/331.7; 528/66; 528/335

(58) Field of Classification Search .............. 428/423.1; 528/66, 335; 156/331.4, 331.7
See application file for complete search history.

(56) References Cited

U.S. PATENT DOCUMENTS

| | | | |
|---|---|---|---|
| 4,595,445 A | 6/1986 | Hombach et al. | |
| 7,364,796 B2 * | 4/2008 | Sasano et al. | 428/423.1 |
| 2003/0225239 A1 | 12/2003 | Nakamura et al. | |
| 2008/0141603 A1 | 6/2008 | Harvey et al. | |
| 2008/0223519 A1 | 9/2008 | Locko et al. | |

FOREIGN PATENT DOCUMENTS

JP        62161815 A  *  7/1987

OTHER PUBLICATIONS

International Preliminary Examination Report and Written Opinion from corresponding PCT application.
H.R. Stapert et al., "Synthesis and Characterization of Aliphatic Poly(Esteramides) Containing Symmetrical Bisamide Blocks", Macromol. Symp. 130, pp. 91-102 (1998).
Claudia Lalli et al., "LiNTf2-Catalyzed Aminolysis of Lactones with Stoichiometric Quantities of Amines", Synlett, 2008, No. 2, pp. 189-192.
Julio A. Seijas et al., "Solvent-free ring opening of e-caprolactone with amines assisted by microwave irradiation", 11th International ECOSOC-II, Nov. 1-30, 2007.

* cited by examiner

*Primary Examiner* — Thao T. Tran
(74) *Attorney, Agent, or Firm* — Mark Montana

(57) ABSTRACT

Urethane adhesive compositions comprising amide based polyols. The amide polyols comprise the reaction product of a reactant selected from the group consisting of lactic acid, lactic acid esters, lactone, glycolic acid, glycolic acid esters, and combinations thereof with one or more amines. The urethane adhesive compositions may be applied in methods of manufacturing a tile installation.

10 Claims, 1 Drawing Sheet

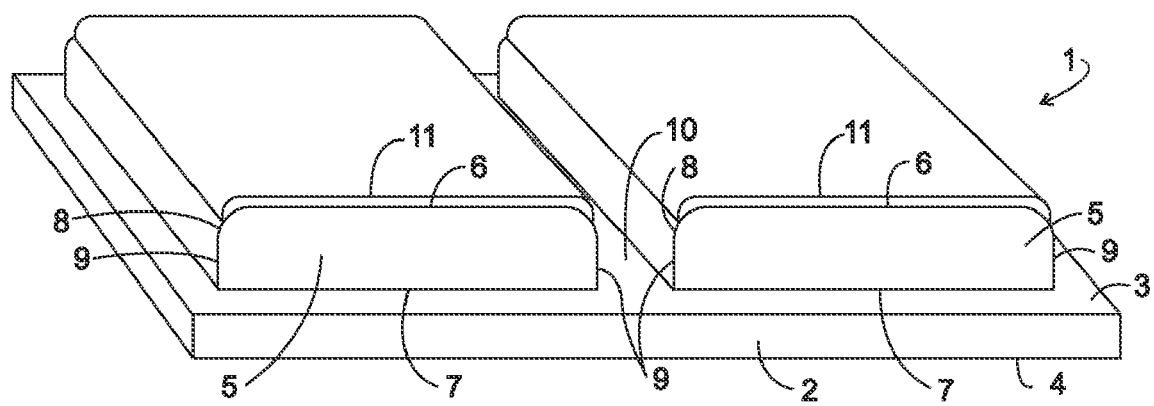

STRUCTURAL URETHANE ADHESIVES COMPRISING AMIDE POLYOLS

BACKGROUND OF THE INVENTION

1. Field of the Invention

The invention concerns structural urethane adhesives comprising amide polyols, including 2-component aliphatic urethane adhesive systems. The adhesives adhere to a wide variety of substrates. For example, the adhesives can be used as grout material in tile applications, particularly ceramic tile applications.

2. The Related Art

Effective structural adhesives require the ability to adhere to a variety of different types of substrate materials and provide structural integrity to a construction. Adhesives that adhere equally well to metals, such as aluminum, wood or other fibrous materials and ceramic or glass materials would provide an exemplary structural adhesive.

Floor tiles are generally installed by mortaring tile directly onto a wood or cement floor and then grouting the tile with a water-based cementitious grout. Water-based cementitious mortars and grouts may perform poorly in very wet applications as well as with tiles that are not moisture sensitive. For example, flooring made of water swellable materials such as particle board cannot be easily used with water-based cements, and certain types of colored marble tiles swell when exposed to water. Thus great care must be taken when installed with a water-based mortar or grout. Also, the flooring and tiles may be adversely affected by moisture due to location of the flooring installation, i.e. sub-grade flooring installations or installations in kitchens or baths to name a few.

Polymeric grouts are useful for flooring installations and tiles that may be adversely affected by moisture. Further, tile installation, with polymeric grout having excellent moisture resistance can be walked on within 2 to 24 hours depending upon the polymeric grout used. This is faster than using conventional techniques with water-based cementitious grout which can take days before the tile can be put into service. For example, epoxy-based adhesives which are commercially available and cure within a day are generally preferred in wet conditions. Water-based polyurethane adhesives also exhibit good grout properties though they are not structural adhesives and can take up to 24 hours before light foot traffic can resume. Solvent-less 2-component aromatic urethane grouts are a good alternative to the epoxy grouts as they are faster curing and have high strength and flexibility but tend to yellow on exposure to sun. On the other hand, 2-component aliphatic polyurethane structural adhesives cure rapidly and exhibit non-yellowing properties and thus would be preferred for flooring and tile installations. However, typical aliphatic polyurethane structural adhesives do not adhere as well to ceramic substrates and have poor strength properties.

All parts and percentages set forth in this specification and the appended claims are on a weight-by-weight basis unless otherwise specified.

SUMMARY OF THE INVENTION

The invention concerns urethane adhesive compositions comprising one or more amide polyols. These adhesive compositions adhere to a wide variety of substrates, such as glass, ceramic and metals, like aluminum. The urethane adhesive composition may be applied as grout material in tile installations, used in place of water-based cementitious grout for adhering ceramic substrates, such as floor and wall tiles and in other tile applications.

The invention further concerns methods for adhering at least one ceramic substrate, such as a floor, wall or other tile, to another ceramic substrate comprising the steps of applying the urethane adhesive composition comprising one or more amide polyols to one or more of the ceramic substrates and contacting the ceramic substrate with the adhesive composition with another ceramic substrate.

The method may be applied to create tile installations, such as floating floor tile installations and floor installations where the tile is directly adhered to a subfloor and/or underlayment. The tile installation typically comprises at least two tiles, such as ceramic tiles, bonded together with the urethane adhesive compositions comprising one or more amide polyols on an underlayment. The method of manufacturing the tile installation comprises a) placing an underlayment over an existing surface, such as a floor, b) placing at least two tiles on the underlayment separated by a gap between the tiles and c) applying urethane adhesive composition comprising one or more amide polyols in the gap between the tiles. The urethane adhesive composition comprising one or more amide polyols may then be struck to contour, if necessary. The adhesive will then cure securing the ceramic tiles to each other and/or an underlayment or a sub-floor.

The tile installation is simple, fast and economical compared to conventional tile installations. For example, the tile installation can be used or walked on within about 2 to about 6 hours which is much faster than using conventional techniques which can take days before the tile can be put into service. The tile installation can be manufactured where water-based installation methods require extensive preparation. In addition, the tile installation can be completely waterproof. The polymeric grout comprising the urethane adhesive compositions having one or more amide polyols has much higher strength and flexibility than conventional cement grout and acts as a structural adhesive to support the tile installation, such as a floating tile floor. Without being bound to any theory the inventors believe that the amide functionality enhances substrate adhesion.

BRIEF DESCRIPTION OF THE DRAWINGS

FIG. 1 shows an embodiment of a tile installation of the invention comprising a release layer which illustrates the relationship between the surfaces of the tile material, the release layer and the grout area.

DETAILED DESCRIPTION OF THE INVENTION

The urethane adhesive composition comprises one or more amide polyols. In embodiments of the invention the amide polyol comprises the reaction product of a reactant selected from the group consisting of lactic acid, lactic acid esters, lactone, glycolic acid, glycolic acid esters and the like and combinations thereof with one or more amines, such as an aliphatic amine.

A particular embodiment involves amide polyols from the combination of lactide and diamines as described by H. R. Stapert, Dijkstra, J. Pieter, and J. Feijen. in Macromol. Symp. (1998), 130 91-102 [CAS #129:4933], which is incorporated by reference herein in its entirety. Incorporation of amide polyols, such as the amide polyols from lactide and diamines as described above is discovered in the invention to provide both good adhesion to ceramic tiles and rapid setting as well as significant increase in strength and flexibility.

Lactic acid esters useful in the invention include lactide (3,6-dimethyl-1,4-dioxane-2,5-dione), methyl lactate, ethyl lactate, propyl lactate, iso-propyl lactate, butyl lactate, tert-butyl lactate, iso-butyl lactate, pentyl lactate and the like and combinations thereof. Glycolic acid esters useful in the invention include glycolide (1,4-dioxane-2,5-dione), methyl glycolate, ethyl glycolate, propyl glycolate, iso-propyl glycolate, butyl glycolate, tert-butyl glycolate, iso-butyl glycolate, pentyl glycolate and the like and combinations thereof.

Lactones useful in the invention include beta-propiolactone, gamma-butyrolactone, delta-valerolactone, epsilon-caprolactone and the like and combinations thereof. Lactone aminolysis techniques which should be familiar to one skilled in the art may be used to form the amide polyol from lactones and amines. Such techniques may include use of catalysts such as $LiNTf_2$ and/or microwave irradiation. Such techniques are described in Lalli, Claudia et al., *$LiNTf_2$-Catalyzed Aminolysis of Lactones with Stoichiometric Quantities of Amines*, SYNLETT 2008, No. 2, pp 0189-0192 and Seijas, Julio A. et al., *Solvent-free Ring Opening of ϵ-Caprolactone with Amines Assisted by Microwave Irradiation*, 11th *International Electronic Conference on Synthetic Organic Chemistry* (*EOSOC*-11), 1-30 Nov. 2007, both of which are incorporated herein in their entirety.

Typically, primary amines, secondary amines and combinations thereof may be used and include those selected from the group consisting of N,N'-bis(3-aminopropyl)methylamine, N,N'-dimethylethylene diamine, neopentanediamine, 4,4'-diaminodiphenyl methane and 2-methylpentamethylenediamine (such as DYTEK® A available from Invista, Wilmington, Del., U.S.A.). Additionally, polyetheramines (such as JEFFAMINE® polyetheramines available from the Huntsman Corporation, The Woodlands, Tex., U.S.A.), may be used in the invention including JEFFAMINE® D series having the structure

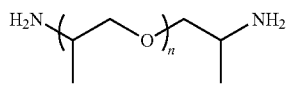

where n is about 2.5 to about 68, JEFFAMINE® EDR series having the structure

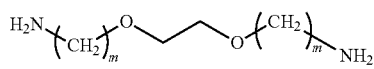

where m is about 2 to about 3, and JEFFAMINE® T series having the structure

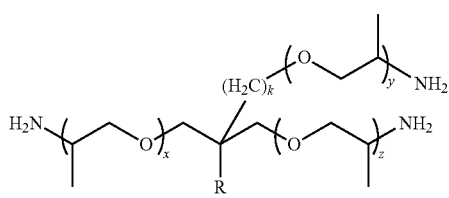

where R is H or $C_2H_5$, k is 0 or 1, and the total of x, y and z is about 5 to about 85. JEFFAMINE® D-230 (n=2.5), JEFFAMINE® EDR-148 (m=2) and JEFFAMINE® T-403 (R=$C_2H_5$, k=1, and x+y+z=5-6) are particularly useful.

The amide polyol is incorporated into a urethane adhesive, such as a urethane based structural adhesive. The urethane adhesive comprises the amide polyol and conventional components of urethane adhesives such as fillers, rheological additives, catalysts, pigments and the like and combinations thereof. In an embodiment, the urethane adhesive is a two-component structural urethane adhesive comprising a curative component having the amide polyol. The adhesive may also comprise other types of polyols, in addition to the amide polyols, including having other polyols in the curative component.

The adhesive may be used as a polymeric grout for ceramic tiles, including a grout material for floating tile installations or other types of tile installations. The polymeric grout may be applied in the method for adhering ceramic tiles. Conventional aliphatic urethane adhesives do not have adequate strength for ceramic tiles, however, the urethane adhesive compositions comprising one or more amide polyols have better strength compared to conventional urethane adhesives, such as conventional aromatic urethane adhesive compositions.

The urethane adhesive compositions comprising one or more amide polyols may be applied to make a tile installation having at least two tiles, such as ceramic tiles, bonded with the urethane adhesive compositions and an underlayment. The tile installations may form a floating surface, such as a floating floor or tile wall panels. The tile installation may also form other types of surfaces, such as horizontal tile installations like table tops and countertops. The underlayment can be any material that can be placed between a surface covering, such as an existing floor, wall or other surface, and a tile material. Typically, the underlayment can be a rigid material, a flexible material or an adhesive material and will generally provide a moisture barrier. Optionally, the tiles may be bonded to the underlayment with the adhesive described herein, a second adhesive or an adhesive tape. The underlayment may, for example, comprise a sub floor, wall, such as a sheet rock surface of the structure where the tile installation is placed. The underlayment may also comprise a horizontal table base surface or horizontal counter base.

Underlayment materials include wood; including plywood, wood particle board, wood planking; cement; foam sheet; fiber glass sheet; plastic sheet; metal sheet; composite sheet and an adhesive layer and combinations thereof. Smaller sections of underlayment can be utilized and joined together to form a larger section.

Typical plastic sheets, such as non-woven and woven plastic sheets, include polyethylene (PE) sheet, polypropylene (PP) sheet, PE/PP sheet, nylon sheet, polyester sheet, mylar sheet, styrenic sheet, polycarbonate sheet, acrylic sheet, acetal sheet, polyethylene terphalate (PET) sheets, acyrlonitrile-butadiene-styrene (ABS) sheet, polyvinyl chloride (PVC) sheet, polytetrafluororethylene (PTFE) sheet, high impact polystyrene (HIPS) sheet, ethylene vinyl alcohol (EVOH) sheet and PP/EVOH sheet.

Typical composite sheets include a polymeric resin and a fibrous material. The polymeric resin typically includes polyester resin, epoxy resin, urethane resin, polysulfone resin, polyphenylsulfone resin, polyether sulfone resin, polyphalamide resin, polyphenylene sulfide resin, aromatic polyketone resin, polyamide-imide resin, polycarbonate resin, styrenic resin, ABS resin, acrylic resin, PET resin and combinations thereof. The fibrous material utilized in the composite sheets typically includes synthetic fibers such as, but not limited to, fiber-glass, carbon fiber, polyethylene fiber, polypropylene fiber, nylon fiber, polyester fiber, and polyamide fiber and natural fibers such as but not limited to hemp, cotton fiber, linen fiber, wool fiber, and combinations of synthetic and natural fibers thereof. In addition to polymeric resin/fibrous material composites, cementitious material/fibrous material composites can be utilized. The cementitious materials can be any type of material containing cement in the formulation, including composite materials made from aggregates such as sand. The fibrous materials can be any of those listed above for the polymeric resin/fibrous material composites. The underlayment may also comprise an adhesive material laid down on the existing floor as a layer. The adhesive material typically includes styrene-butadiene rubber adhesives, such as PLIOSEAL® from Ashland Inc., Dublin, Ohio, U.S.A., urethanes and combinations thereof.

Preferably the tile material is a ceramic tile. Other tile materials that may be used with the urethane adhesives of the invention, applied in the methods of the invention or used as a component of the tile installations described herein, include porcelain tile, terra cotta tile, marble tile, concrete tile, slate tile, granite tile, wood tile, glass tile, metal tile, plastic tile, engineered stone tile and combinations thereof.

In an embodiment, the tile installation comprises a floating floor tile installation typically manufactured by placing an underlayment over an existing floor then placing at least two tiles on the underlayment separated by a gap between the tiles. Next, the adhesive composition comprising one or more amide polyols is applied into the gap between tiles and the adhesive is optionally struck to shape and allowed to cure producing the tile installation such as a floating floor. The tiles may be optionally placed onto the underlayment with a spacer to insure uniform spacing between the tiles. In addition, one or more of the tiles may be bonded to the underlayment with an adhesive, including the adhesive of the invention comprising the amide polyol, a pressure sensitive adhesive composition and/or adhesive tape prior to applying the adhesive compositions comprising one or more amide polyols as a grout material. Decorative particles may also be applied to the adhesive composition after applying the adhesive into the gaps between the tiles. The particles are applied before the adhesive composition comprising one or more amide polyols completely cures. The particles are then bonded to the adhesive after the adhesive cures.

In order to expedite clean-up, the tiles may be protected with a release layer, such as tape or film applied to the exposed surface of the tiles prior to applying the adhesive composition comprising one or more amide polyols into the gap between the tiles. The tape or film is then removed before the polymeric grout cures leaving a clean finish. An alternative method to ease clean-up is to protect the tile surface, i.e. the exposed surface, with a release agent prior to applying the adhesive composition comprising one or more amide polyols. After the adhesive composition has cured, excess adhesive may be peeled from the surface of the tile and the tile cleaned with a suitable solvent, such as water, to remove the release agent.

FIG. 1 illustrates an embodiment utilizing the release layer in order to achieve a clean grout line on the tile or flooring installation. As shown in FIG. 1, the tile or flooring installation 1 comprises an underlayment 2 having a first surface 3 and a second surface 4 with one or more tiles 5 adjacent to the first surface 3 of the underlayment 2. The tiles 5 comprise an upper surface 6, a lower surface 7 and a vertical edge 9. Adjacent to the upper surface 6 of the tiles is a transitional section 8 which extends from the upper surface 6 of each tile to the vertical edges 9 of the tiles. The vertical edges 9 of the tiles 5 extend from the transitional section 8 to the lower surface 7. One skilled in the art would appreciate that the tiles may be any geometric shape having one or more, generally three or more and typically four or more, vertical edges and transitional sections extending from the top surface to the bottom surface of the tile. The tiles 5 are generally positioned on the underlayment 2 so that a gap 10 exists between the vertical edges 9 and, optionally, some or all of the transitional sections 8 of the tiles 5. The gap may be completely or partially filled with the structural urethane adhesives of the invention. The release layer 11, which may be applied as a tape, film, coating or agent, is placed on the upper surface 6 of the tile 5 and may extend partially over the transitional section 8. A typical method for implementing the release layer 11 comprises applying a water based composition to the upper surface 6 of the tile surface, and optionally partially over the transitional section 8, before the adhesive composition comprising one or more amide polyols is applied. After the adhesive composition is applied and cured, the release layer is washed off the tile leaving a clean grout line.

EXAMPLES

Example 1

A dilactamide was made from DYTEK® A and lactide. A 50 ml., 3-necked, round bottomed flask was charged with 10.00 g (0.0860 mole) DYTEK® A amine (2-methyl-1,5-pentanediamine) and 23.64 g isopropyl alcohol. The flask contents were blanketed with dry nitrogen and stirred with a magnetic stirrer. Lactide (13.64 g, 0.0946 mole) was added, in portions, over two minutes, during which time an exothermic reaction occurred. The flask was immersed in an oil bath, which was then heated from ambient temperature to 85° C. over one hour and then held, with stirring, for three hours. The reaction mixture was transferred to a 100 ml. round bottomed flask and stripped of isopropyl alcohol on a rotary evaporator at 60° C. under water aspirator vacuum. The product was a red-orange, viscous oil. C-13 NMR spectral analysis showed that the 1-amino group was greater than about 90% reacted and the 5-amino group was greater than about 95% reacted.

Example 2

A dilactamide was made from DYTEK® A and lactic acid. A 100 ml., round bottomed flask was charged with 18.64 g (0.1604 mole) DYTEK® A amine. While stirring with a magnetic stirrer, 34.00 g (0.3208 mole) of about 85% lactic acid was added over 13 minutes. The flask was immersed in a water bath for part of the time to help control the exotherm. The flask was equipped for distillation and immersed in an oil bath. With a slow stream of nitrogen flowing from reaction flask to receiver, the oil bath was heated from room temperature to 175° C. in three hours. The temperature was held at 175° C. for an additional hour. Residual water was removed from the reaction product on a rotary evaporator at 70° C. under water aspirator vacuum. A yellow-orange, viscous oil (43.98 g) was obtained. C-13 NMR analysis showed that 100% of both amino groups were reacted and about 17% of original lactic acid was still present.

Example 3

A dilactamide was made from DYTEK® A and lactic acid. A 100 ml., round bottomed flask was charged with 116.21 g (1 mole) DYTEK® A amine. While stirring with a magnetic stirrer, 200.21 g (2 moles) of about 85% lactic acid along with 0.25 g (0.2 mole) of boric acid was added slowly. The flask was immersed in a water bath for part of the time to help control the exotherm. The flask was equipped for distillation and immersed in an oil bath. With a slow stream of nitrogen flowing from reaction flask to receiver, the oil bath was heated from room temperature to 175° C. in three hours. The temperature was held at 175° C. for 2 more hours. Residual water was removed from the reaction product on a rotary evaporator at 70° C. under water aspirator vacuum. A yellow-orange, viscous oil was obtained. C-13 NMR analysis showed that 100% of both amino groups were reacted and about 10% of original lactic acid was still present.

Example 4

An amide polyol is incorporated into a urethane adhesive system. The DYTEK® A/lactide adduct was made for this example by combining 116 g of DYTEK® A amine and 144 g of lactide, with the lactide added in successive portions of 25 g, 25 g, 50 g and 44 g to control exotherm. After each portion the batch was cooled down to 40° C. before next portion was added. After all lactide portions were added the mixture was held for 2 hours at 85° C. with a nitrogen flush. From this DYTEK® A/lactide adduct a curative component having the components set forth in Table 1 was made. The components were mixed using a speed mixer at 1,800 rpm for 2 minutes.

TABLE 1

| Component | Weight |
|---|---|
| Castor Oil, Low Moisture | 51.21 g |
| MP Diol | 3.25 g |
| DYTEK ® A/Lactide Adduct | 35.00 g |
| CAB-O-SIL ® TS 720 | 3.25 g |
| MISTRON ® RCS Talc | 5.25 g |
| Molecular Sieves | 1.30 g |
| Piperazine | 0.77 g |
| DABCO ® T-12 | 0.013 g |

CAB-O-SIL ® TS 720 is fumed silica is available from the Cabot Corporation, Boston, Massachusetts. MISTRON ® RCS Talc is available from Rio Tinto Mineral, London, U.K.. DABCO ® T-12 is a dibutyltindilaurate catalyst available from Air Products and Chemicals, Inc., Allentown, Pennsylvania, U.S.A. ("Air Products").

6.5 g of the curative described above was mixed with 8.45 g of a MDI (4,4'-diphenylmethane diisocyanate) based prepolymer in a speed mixer for 1 minute at 1,800 rpm. The curative/prepolymer mixture was applied to a test area of 1"×0.5" using 20 mm glass beads as spacers to control the bond line thickness. The bond was permitted to "set up" overnight and then post baked at 250° F. for 30 minutes. After cooling for about 1 hour the material was tested by being pulled at a rate of 0.5 inches/minute. The results averaged 1,596 psi with a standard deviation of 35.5 psi. Lap shears for the same 2-component urethane made without amide polyol as part of the curative, tested on aluminum without surface treatment, gave results ranging from 500 psi to 700 psi.

Example 5

A dilactamide was made from VESTAMIN® TMD amine (Evonik Industries, Parsippany, N.J., U.S.A.) and lactide. A 50 ml., 3-necked, round bottomed flask was charged with 12.00 g (0.0758 mole) VESTAMIN® TMD (mixture of 2,2,4-trimethyl-1,6-hexanediamine and 2,4,4-trimethyl-1,6-hexanediamine) and 24.02 g isopropyl alcohol. The flask contents were blanketed with dry nitrogen and stirred with a magnetic stirrer. Lactide (12.02 g, 0.0834 mole) was added, in portions, over four minutes, during which time an exothermic reaction occurred. The flask was immersed in an oil bath, which was then heated from ambient temperature to 85° C. over one hour and then held, with stirring, for three hours. The reaction mixture was transferred to a 100 ml. round bottomed flask and stripped of isopropyl alcohol on a rotary evaporator at 60° C. under water aspirator vacuum. The product was an orange, viscous oil. C-13 NMR spectral analysis showed that the 1-amino group was about 60-70% reacted and the 2-amino group was greater than about 95% reacted in the 2,2,4-trimethyl isomer, while both amino groups in the 2,4,4-isomer were greater then about 99% reacted.

Example 6

A dilactamide was made from DYTEK® A and ethyl lactate. A 500 ml. glass reactor was charged with 164.85 g (1.4186 mole) DYTEK® A amine. The reactor contents were blanketed with dry nitrogen and stirred with a mechanical stirrer. Ethyl lactate (335.15 g, 2.8371 mole) was added, by pressure equalizing addition funnel, over ten minutes, during which time an exothermic reaction occurred. The reaction mixture was then heated to 110° C. and the reaction byproduct, ethanol, was separated by atmospheric distillation over several hours followed by a short vacuum distillation. The product was an orange, viscous oil. C-13 NMR analysis showed that 100% of both amino groups were reacted and about 2% of original ethyl lactate was still present.

Example 7

A dilactamide was made from DYTEK® A and ethyl lactate using boric acid catalyst. A 500 ml., glass reactor was charged with 158.79 g (1.3664 mole) DYTEK® A amine, 322.83 g ethyl lactate (2.7328 mole) and 3.38 g boric acid (0.0547 mole). The reactor contents were blanketed with dry nitrogen and stirred with a mechanical stirrer. The reaction mixture was heated to 110° C. and the reaction byproduct, ethanol, was separated by atmospheric distillation over several hours followed by a short vacuum distillation. The product was an orange, viscous oil. C-13 NMR spectral analysis showed that the 1-amino group was greater than about 90% reacted and the 5-amino group was greater than about 95% reacted.

Example 8

A dilactamide was made from JEFFAMINE® D-230 and molten lactide. A 1000 ml. glass reactor was charged with 92.22 g JEFFAMINE® D-230, blanketed with dry nitrogen and stirred with a mechanical stirrer. To this, molten lactide (57.78 g) was added at a rate to control the exotherm temperature. Once the lactide addition was complete the reaction mixture was heated to 85° C. and held for several hours ensuring that the dilactamide formation was complete. At this point the dilactamide was not isolated but formulated as a curative by adding additional reactive components, fillers and catalyst such as the aliphatic 2-component adhesive curative formulation given below in Example 9.

Example 9

Aliphatic 2-Component Adhesive

A prepolymer was made with the following components set forth in Table 2.

TABLE 2

| Component | Weight |
|---|---|
| 2000 MW Polyether diol | 281.1 g |
| 400 MW Polyether triol | 59.4 g |
| DESMODUR ® W | 792.6 g |
| MISTRON ® RCS Talc | 67.8 g |
| Hydrophobic Fumed Silica | 150.0 g |
| Molecular Sieves | 148.4 g |
| DABCO ® T-12 | 0.75 g |

A reactor was charged with polyols and DABCO® T-12 and heated while mixing to 93° C. To this talc and fumed silica were added. The mixture was dried at 93° C. under 24" Hg vacuum for 1 hour followed by cooling to 68° C. At 68° C., half of the isocyanate (DESMODUR® W, dicyclohexyl methane diisocyanate from Bayer Material Science LLC, Pittsburgh, Pa., U.S.A.) was added, followed by the molecular sieves. The reaction was mixed at 68° C. for 1 hour at 24 inches Hg and then the second half of the isocyanate was added. The reaction was held at 68° C. and 24 inches Hg for an additional hour to form the prepolymer.

A curative was made with the components, set forth in Table 3.

TABLE 3

| Component | Weight |
|---|---|
| 3200 MW Polyether triol | 198.2 g |
| 400 MW Polyether triol | 315.5 g |
| DESMODUR ® W | 11.2 g |
| BENTONE ® 27 | 13.1 g |
| MISTRON ® RCS Talc | 159.0 g |
| Hydrophobic Fumed Silica | 45.0 g |
| Molecular Sieves | 7.5 g |
| DABCO ® T-12 | 0.38 g |
| DABCO ® T-9 | 5.2 g |

A reactor was charged with polyols (BENTONE® 27 organophilic clay from Elementis Specialities, Inc., Hightstown, N.J., U.S.A.) and DABCO® T-12 and heated with mixing to 116° C. under 24 inches Hg vacuum. The mixture was held at 116° C., 24 inches Hg for 1 hour and then cooled to 66° C. At 66° C., the isocyanate (DESMODUR® W) was added and the reaction was heated to 82° C. under 24 inches Hg and held for 30 minutes followed by heating to 93° C. At 93° C., talc and fumed silica were added and the mixture was then heated to 116° C. under 24 inches Hg. After holding for 30 minutes, the reaction is cooled to 66° C. and DABCO® T-9 catalyst (stannous octoate from Air Products) is added. This is allowed to mix for 30 minutes under dry nitrogen to form the curative. The amide polyols may be incorporated into the curative as per the compositions discussed in Table 4 (Example 10 below) by directly replacing 20% of the polyols listed in Table 3.

Example 10

Flex/Modulus Testing of Edge Bonded Ceramic Tile

Various sample combinations of adhesives as set forth in Table 4 were tested after application to ceramic tile. Various amide polyols, as set forth in Table 4, were incorporated into the curative (see, Example 9) by replacing 20% of the polyols listed in Table 3 with the respective amide polyols while keeping the ratios of the listed polyols within the formulations generally the same prior to and after the replacement. Typically, the Prepolymer:Curative mix ratio was about 1:1 by volume. The adhesive was applied to 2"×12"×¼" ceramic tiles that were edge bonded at the grout joint. After application, the adhesive was permitted to cure for about 24 hours at room temperature. The test applied was ASTM C1505-01 (2007) Modified (3 point bend offset from grout joint) which is incorporated herein by reference in its entirety. The rate was about 0.11 in/min with a span of about 4.0 inches. The results are set forth in Table 4.

TABLE 4

| Adhesive Comprehension Samples | Flex psi | Modulus ksi | Failure | | |
|---|---|---|---|---|---|
| | | | Adhesive | Cohesive | Substrate |
| Aromatic 2-component adhesive | 1759 | 538 | 79 | 12 | 9 |
| Aromatic 2-component adhesive plus 20 wt % of Example 1 composition in curative | 1862 | 472 | 63 | 30 | 9 |
| Aliphatic 2-component adhesive of Example 9 | 521 | 26 | 94 | 5 | 1 |
| Aliphatic 2-component adhesive of Example 9 with 20 wt % of the polyols in the curative replaced with dilactamide of Example 1 | 1578 | 486 | 75 | 22 | 3 |
| Aliphatic 2-component adhesive of Example 9 with 20 wt % of the polyols in the curative replaced with dilactamide of Example 1 and further comprising piperazine | 1141 | 253 | 40 | 61 | 0 |
| Aliphatic 2-component adhesive of Example 9 plus 20 wt % of the polyols in the curative replaced with dilactamide of Example 1 and reacted into the curative | 1161 | 290 | 47 | 53 | 0 |
| Aliphatic 2-component adhesive of Example 9 with 20 wt % of the polyols in the curative replaced with dilactamide of Example 2 | 142 | 39 | 5 | 95 | 0 |
| Aliphatic 2-component adhesive of Example 9 with 20 wt % of the polyols in the curative replaced with dilactamide of Example 3 | 1456 | 327 | 38 | 62 | 1 |

TABLE 4-continued

| Adhesive Comprehension Samples | Flex psi | Modulus ksi | Failure Adhesive | Failure Cohesive | Failure Substrate |
|---|---|---|---|---|---|
| Aliphatic 2-component adhesive of Example 9 with 20 wt % of the polyols in the curative replaced with dilactamide of Example 6 | 1435 | 343 | 69 | 32 | 0 |
| Aliphatic 2-component adhesive of Example 9 with 20 wt % of the polyols in the curative replaced with dilactamide of Example 7 | 1418 | 332 | 42 | 59 | 0 |
| Aliphatic 2-component adhesive of Example 9 with 20 wt % of the polyols in the curative replaced with dilactamide of Example 8 | 1687 | 343 | 83 | 10 | 8 |

A significant increase in the flexural strength as well as the modulus of the aliphatic 2-component adhesive can be seen on incorporation of amide polyol on the curative side.

We claim:

1. A urethane adhesive composition comprising an amide polyol consisting of the reaction product of a reactant selected from the group consisting of lactic acid, lactic acid esters, glycolic acid, glycolic acid esters, and combinations thereof with one or more amines.

2. The urethane adhesive composition of claim 1 wherein the lactic acid ester is selected from the group consisting of lactide (3,6-dimethyl-1,4-dioxane-2,5-dione), methyl lactate, ethyl lactate, propyl lactate, iso-propyl lactate, butyl lactate, tert-butyl lactate, iso-butyl lactate, pentyl lactate and combinations thereof.

3. The urethane adhesive composition of claim 1 wherein the glycolic acid ester is selected from the group consisting of glycolide (1,4-dioxane-2,5-dione), methyl glycolate, ethyl glycolate, propyl glycolate, iso-propyl glycolate, butyl glycolate, tert-butyl glycolate, iso-butyl glycolate, pentyl glycolate and combinations thereof.

4. The urethane adhesive composition of claim 1 wherein the amine is selected from the group consisting of a primary amine, a secondary amine and combinations thereof.

5. The urethane adhesive composition of claim 1 wherein the amine is an aliphatic amine.

6. The urethane adhesive composition of claim 1 wherein the amine is selected from the group consisting of N,N'-bis(3-aminopropyl)methylamine, N,N'-dimethylethylene diamine, neopentanediamine, 4,4'-diaminodiphenyl methane, 2-methylpentamethylenediamine and polyetheramine.

7. The urethane adhesive composition of claim 6 wherein the polyetheramine is selected from the group consisting of a) an amine having the structure

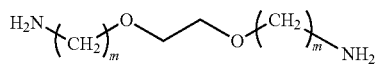

wherein n is about 2.5 to about 68, b) an amine having the structure $$H_2N-(CH_2)_m-O-CH_2CH_2-O-(CH_2)_m-NH_2$$

wherein m is about 2 or about 3 and c) an amine having the structure

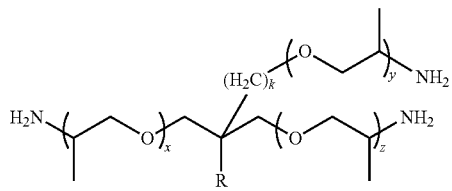

wherein R is H or $C_2H_5$, k is 0 or 1, and the total of x, y and z is about 5 to about 85.

8. The urethane adhesive composition of claim 1 comprising a prepolymer and a curative wherein the curative comprises the amide polyol.

9. A method of adhering at least one ceramic substrate to another ceramic substrate comprising the steps of applying the urethane adhesive composition of claim 1 to one or more of the ceramic substrates and contacting the ceramic substrate with the adhesive composition to another ceramic substrate.

10. A method of manufacturing a tile installation comprising the steps a) placing an underlayment over an existing surface, b) placing at least two tiles on the underlayment separated by a gap between the tiles and c) applying the urethane adhesive composition of claim 1 in the gap between the tiles.

* * * * *